(12) United States Patent
Zhao et al.

(10) Patent No.: US 11,110,806 B2
(45) Date of Patent: Sep. 7, 2021

(54) VEHICLE MANEUVER PLANNING BASED ON PREDICTED BATTERY POWER

(71) Applicant: Ford Global Technologies, LLC, Dearborn, MI (US)

(72) Inventors: Yanan Zhao, Ann Arbor, MI (US); Xiaohong Nina Duan, Canton, MI (US); Mark Steven Yamazaki, Canton, MI (US); William David Treharne, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 268 days.

(21) Appl. No.: 16/439,113

(22) Filed: Jun. 12, 2019

(65) Prior Publication Data

US 2020/0391597 A1 Dec. 17, 2020

(51) Int. Cl.
*B60L 15/20* (2006.01)
*B60L 58/26* (2019.01)
(Continued)

(52) U.S. Cl.
CPC .......... *B60L 15/2045* (2013.01); *B60L 50/50* (2019.02); *B60L 58/26* (2019.02); *G05D 1/0088* (2013.01); *G05D 1/0212* (2013.01); *G08G 1/012* (2013.01); *G08G 1/0112* (2013.01); *G08G 1/22* (2013.01); *H01M 10/613* (2015.04); *H01M 10/625* (2015.04); *H01M 10/633* (2015.04); *H01M 10/6563* (2015.04); *H01M 10/6568* (2015.04);
(Continued)

(58) Field of Classification Search
CPC .. B60L 15/2045; B60L 15/2072; B60L 15/10; B60L 58/24–26; B60L 58/16; B60L 58/12; B60L 58/30; B60L 58/32; B60L 58/33; B60L 50/50–75; B60L 2240/12; B60L 2240/14; B60L 2240/545; B60L 2240/645; B60L 2240/68; B60L 2240/622; B60L 2240/549; B60L 1/02; B60L 1/003; B60L 2250/12; B60L 2260/56; B60L 2260/54; G08G 1/0112; G08G 1/012; G08G 1/22; G05D 1/0212; G05D 1/0088; G05D 1/021; G05D 1/0217; G05D 1/0223; G05D 2201/0213; H01M 10/60; H01M 10/613; H01M 10/6563; H01M 10/625; H01M 10/6568; H01M 10/633; H01M 2220/20; Y02T 90/16; Y02T 90/72; Y02T 10/64; Y02T 10/70

See application file for complete search history.

(56) References Cited

U.S. PATENT DOCUMENTS

| 8,942,919 | B2 * | 1/2015 | Uyeki | G01C 21/3469 |
| | | | | 701/423 |
| 10,202,144 | B2 | 2/2019 | Brown et al. | |
| 2020/0164855 | A1 * | 5/2020 | Hashimoto | B60W 20/10 |

* cited by examiner

*Primary Examiner* — Aaron L Troost
(74) *Attorney, Agent, or Firm* — David B. Kelley; Brooks Kushman P.C.

(57) ABSTRACT

A vehicle includes a traction battery and a controller. The controller, responsive to a command to enter a highway, confirmation the traction battery can output power to accelerate the vehicle to enter the highway via an entrance at a same speed as traffic on the highway in a vicinity of the entrance, and an increase in temperature beyond a threshold of the traction battery predicted to occur on the highway due to expected commands to maintain the same speed on the highway with power from the traction battery, increases cooling of the traction battery prior to entering the highway.

19 Claims, 6 Drawing Sheets

(51) Int. Cl.
*B60L 50/50* (2019.01)
*G08G 1/01* (2006.01)
*G08G 1/00* (2006.01)
*G05D 1/02* (2020.01)
*H01M 10/613* (2014.01)
*H01M 10/6563* (2014.01)
*H01M 10/625* (2014.01)
*H01M 10/6568* (2014.01)
*H01M 10/633* (2014.01)
*G05D 1/00* (2006.01)

(52) U.S. Cl.
CPC ..... *B60L 2240/14* (2013.01); *B60L 2240/545* (2013.01); *B60L 2240/645* (2013.01); *B60L 2240/68* (2013.01); *G05D 2201/0213* (2013.01); *H01M 2220/20* (2013.01)

VEHICLE MANEUVER PLANNING BASED ON PREDICTED BATTERY POWER

TECHNICAL FIELD

The present disclosure relates to the control of vehicles.

BACKGROUND

Electric-powered vehicles are propelled by an electric motor using power from a traction battery. Electric motors may accelerate faster than conventional engines, allowing the electric-powered vehicles to perform maneuvers such as accelerating and merging onto a highway in a short period of time. The battery discharge power from the traction battery may depend on various factors including state-of-charge (SoC) and battery temperature.

SUMMARY

In one or more illustrative embodiment of the present disclosure, a vehicle includes a traction battery, and a controller programmed to, responsive to a command to enter a highway, confirmation the traction battery can output power to accelerate the vehicle to enter the highway via an entrance at a same speed as traffic on the highway in a vicinity of the entrance, and an increase in temperature beyond a threshold of the traction battery predicted to occur on the highway due to expected commands to maintain the same speed on the highway with power from the traction battery, increase cooling of the traction battery prior to entering the highway.

In one or more illustrative embodiment of the present disclosure, a method for controlling a vehicle includes responsive to receiving a command to enter a highway via a first of a plurality of entrances and confirming a traction battery cannot output power to accelerate the vehicle to enter the highway via the first of the plurality of entrances at a same speed as traffic on the highway in a vicinity of the first of the plurality of entrances, operating by a controller the vehicle to bypass the first of the plurality of entrances and approach another of the plurality of entrances.

In one or more illustrative embodiment of the present disclosure, a vehicle includes a traction battery configured to output power for propulsion of the vehicle, and one or more controllers programmed to, responsive to indication that power of the traction battery output for propulsion of the vehicle will not maintain a same speed as traffic on a highway due to a predicted increase in temperature of the traction battery, operate the vehicle to exit the highway via a next available exit.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices, such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programed to perform any number of the functions as disclosed.

The present disclosure, among other things, proposes a system for operating a vehicle based on battery discharge power. More specifically, the present disclosure proposes a system for controlling vehicle maneuvers based on vehicle battery temperature as well as other factors.

Figure 1:
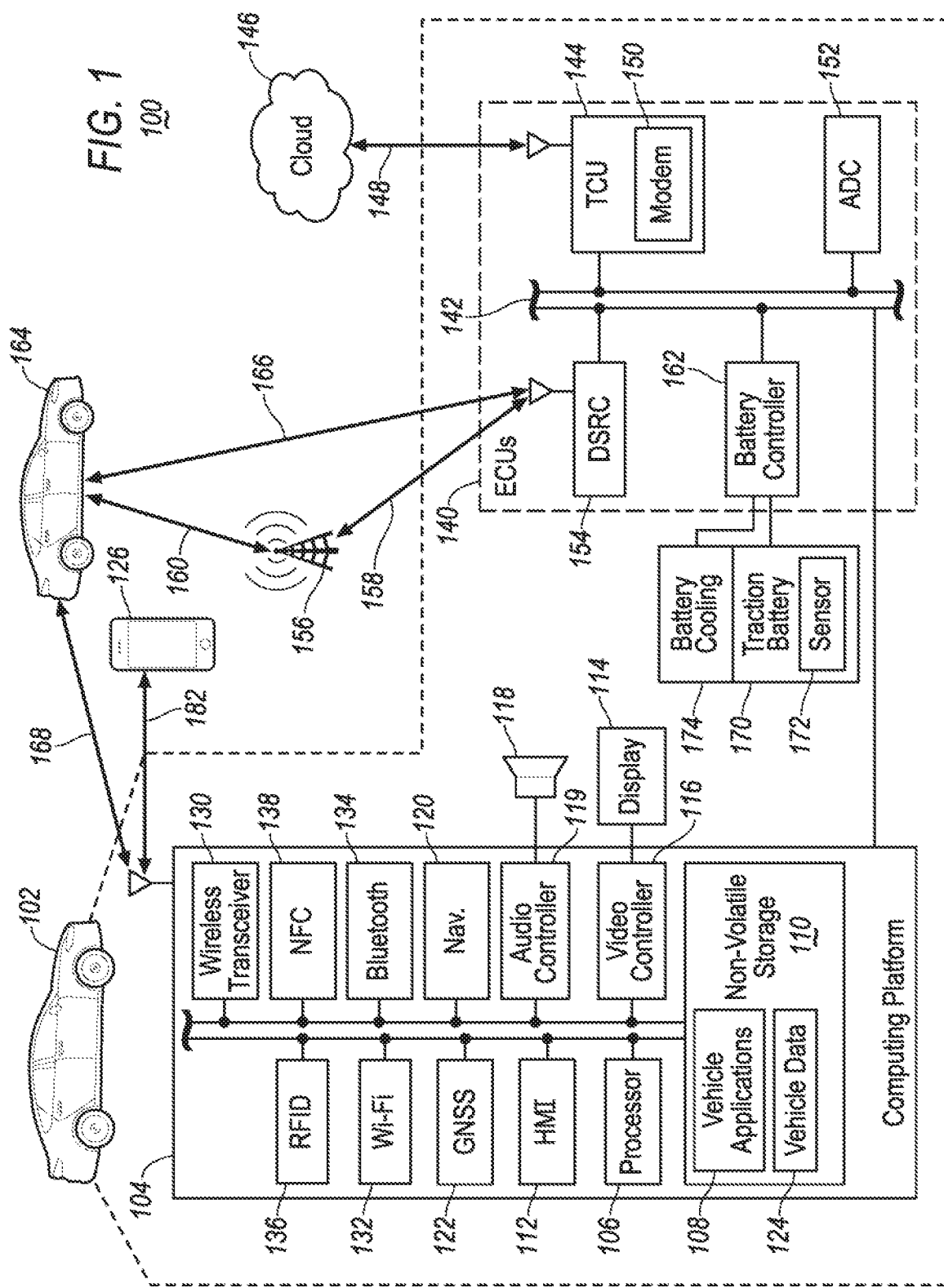
FIG. 1 illustrates an example block topology of a vehicle system.

Referring to FIG. 1, an example block topology of a vehicle system 100 of one embodiment of the present disclosure is illustrated. A vehicle 102 may include various types of automobile, crossover utility vehicle (CUV), sport utility vehicle (SUV), truck, recreational vehicle (RV), or other mobile machine for transporting people or goods. The vehicle 102 may be a battery electric vehicle (BEV), a hybrid electric vehicle (HEV) powered by both an internal combustion engine and one or more electric motors, such as a series hybrid electric vehicle (SHEV), a parallel hybrid electric vehicle (PHEV), or a parallel/series hybrid vehicle (PSHEV). As an example, the system 100 may include the SYNC system manufactured by The Ford Motor Company of Dearborn, Michigan. It should be noted that the illustrated system 100 is merely an example, and more, fewer, and/or differently located elements may be used.

As illustrated in FIG. 1, a computing platform 104 may include one or more processors 106 configured to perform instructions, commands, and other routines in support of the processes described herein. For instance, the computing platform 104 may be configured to execute instructions of vehicle applications 108 to provide features such as navigation, data processing, and wireless communications. Such instructions and other data may be maintained in a non-volatile manner using a variety of types of computer-readable storage medium 110. The computer-readable medium 110 (also referred to as a processor-readable medium or storage) includes any non-transitory medium (e.g., tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants/users to interface with the computing platform 104. For example, the computing platform 104 may receive input from human-machine interface (HMI) controls 112 configured to provide for occupant interaction with the vehicle 102. As an example, the computing platform 104 may interface with one or more buttons (not shown) or other HMI controls configured to invoke functions on the computing platform 104 (e.g., steering wheel audio buttons, a push-to-talk button, instrument panel controls, etc.).

The computing platform 104 may also drive or otherwise communicate with one or more displays 114 configured to provide visual output to vehicle occupants by way of a video controller 116. In some cases, the display 114 may be a touch screen further configured to receive user touch input via the video controller 116, while in other cases the display 116 may be a display only, without touch input capabilities. The computing platform 104 may also drive or otherwise communicate with one or more speakers 118 configured to provide audio output to vehicle occupants by way of an audio controller 119.

The computing platform 104 may also be provided with navigation and route planning features through a navigation controller 120 configured to calculate navigation routes responsive to user input via e.g., the HMI controls 112, and output planned routes and instructions via the speaker 118 and the display 114. Location data that is utilized for navigation may be collected from a global navigation satellite system (GNSS) controller 122 configured to communicate with multiple satellites and calculate the location of the vehicle 102. The GNSS controller may be configured to support various current and/or future global or regional location systems such as global positioning system (GPS), Galileo, Beidou, Global Navigation Satellite System (GLONASS) and the like. Map data used for route planning may be stored in the storage 110 as a part of the vehicle data 124. Navigation software may be stored in the storage 110 e.g. as a part of the vehicle applications 108. Alternatively, navigation software may be stored individually within the navigation controller 120 provided with non-volatile storage medium (not shown).

The computing platform 104 may be configured to wirelessly communicate with a mobile device 126 of the vehicle users/occupants via a wireless connection 128 through a wireless transceiver 130. The mobile device 126 may be any of various types of portable computing device, such as cellular phones, tablet computers, smart watches, laptop computers, portable music players, or other device capable of communication with the computing platform 104. The wireless transceiver 130 may be in communication with a Wi-Fi controller 132, a Bluetooth controller 134, a radio-frequency identification (RFID) controller 136, a near-field communication (NFC) controller 138, and other controllers such as a Zigbee transceiver, an IrDA transceiver (not shown), and configured to communicate with a compatible wireless transceiver (not shown) of the mobile device 126.

The computing platform 104 may be further configured to communicate various electronic control units (ECUs) 140 via one or more in-vehicle network 142. The in-vehicle network 142 may include, but is not limited to, one or more of a controller area network (CAN), an Ethernet network, and a media-oriented system transport (MOST), as some examples.

The ECUs 140 may include various computers/controllers configured to perform various operations of the vehicle 102. As a few non-limiting examples, the ECUs 140 may include a telematics control unit (TCU) 144 configured to control telecommunication between vehicle 102 and a cloud 146 through a wireless connection 148 using a modem 150. The ECUs 140 may further include an autonomous driving controller (ADC) 152 configured to monitor and control the autonomous driving features of the vehicle 102. Some autonomous driving feature may include lane keep assist, safe distance from other vehicles, cruise control, hands-off-wheel alert, autobraking, brake mitigation with multiple sensitivity levels or the like. Additionally or alternatively, the ADC 152 may be configured to communicate with the navigation controller 120 as well as various sensors (not shown) of the vehicle 102 to provide fully autonomous driving features to a vehicle user.

The ECUs 140 may further include a dedicated short-range communication (DSRC) controller 154 configured to wirelessly communicate with compatible controllers of other vehicles or digital entities. For instance, the vehicle 102 may be configured to communicate with a fleet vehicle 164 via the DSRC controller 154 through a DSRC link 166 (a.k.a. a vehicle-to-vehicle (V2V) connection). Additionally or alternatively, the vehicle 102 may be configured to communicate with the fleet vehicle 164 via the wireless transceiver 130 through a wireless connection 168 (also a V2V connection). Additionally or alternatively, the vehicle 102 may be configured to communicate with the fleet vehicle 164 via an infrastructure 156 through vehicle-to-infrastructure (V2I) connections 158, 160. The fleet vehicle 164 may be any vehicle provided with compatible transceivers and software to communicate with the vehicle 102. The infrastructure 156 may include any devices configured to support any type of communication technology in communication with the vehicle 102 via the DSRC controller 154, the wireless transceiver 130, the mobile device 126 as well as other controllers provided with communication capabilities. For instance, the infrastructure may include a DSRC transponder, a cellular tower, a Wi-Fi device or the like as a few non-limiting examples.

The ECUs 140 may further include a battery controller 162 in communication with a traction battery 170. The battery controller 162 may be configured to monitor and manage operation of the traction batter 170 such as via an electronic monitoring system (not shown) that manages temperatures and stat of charge (SoC) of battery cells. The traction battery (or battery pack) 170 may be configured to store and provide energy that may be used by an electric motor/machine (not shown) of the vehicle 102. The traction battery 170 may be provided with various sensors 172 configured to provide battery status data to the battery controller 162. For instance, the sensors 172 may include a temperature sensor to monitor the temperature of battery cells. The traction battery 170 may provide a high voltage DC output from one or more battery cell arrays, sometimes referred to as battery cell stacks, within the traction battery 170. The battery cell arrays may include one or more battery cells. Power output of the traction battery 170 may be dependent on various factors such as SoC and temperature. In general, high SoC may increase output power of the traction battery 170, whereas low SoC may decrease the output power. The output power of the traction battery 170 may further depend on temperature. Low temperature may constrain output power of the traction battery 170 whereas high battery temperature may increase output power. Therefore, the battery controller 162 may be configured to restrict the battery power when the temperature from the sensor 172 is above a predefined threshold. Available maneuvers (e.g. acceleration) for the vehicle 102 may depend a currently available output power from the traction battery 170. To prevent overheating and optimize the battery life and performance affected by temperature, a battery cooling system 174 may be attached to the traction battery 170 configured to provide cooling to the battery. The battery cooling system 174 may include any type of air-cooling (e.g. air vents and fans) or liquid cooling (e.g. liquid coolant circulation) operated by the battery controller 162 based on the battery temperature detected via the sensor 172.

Figure 2:
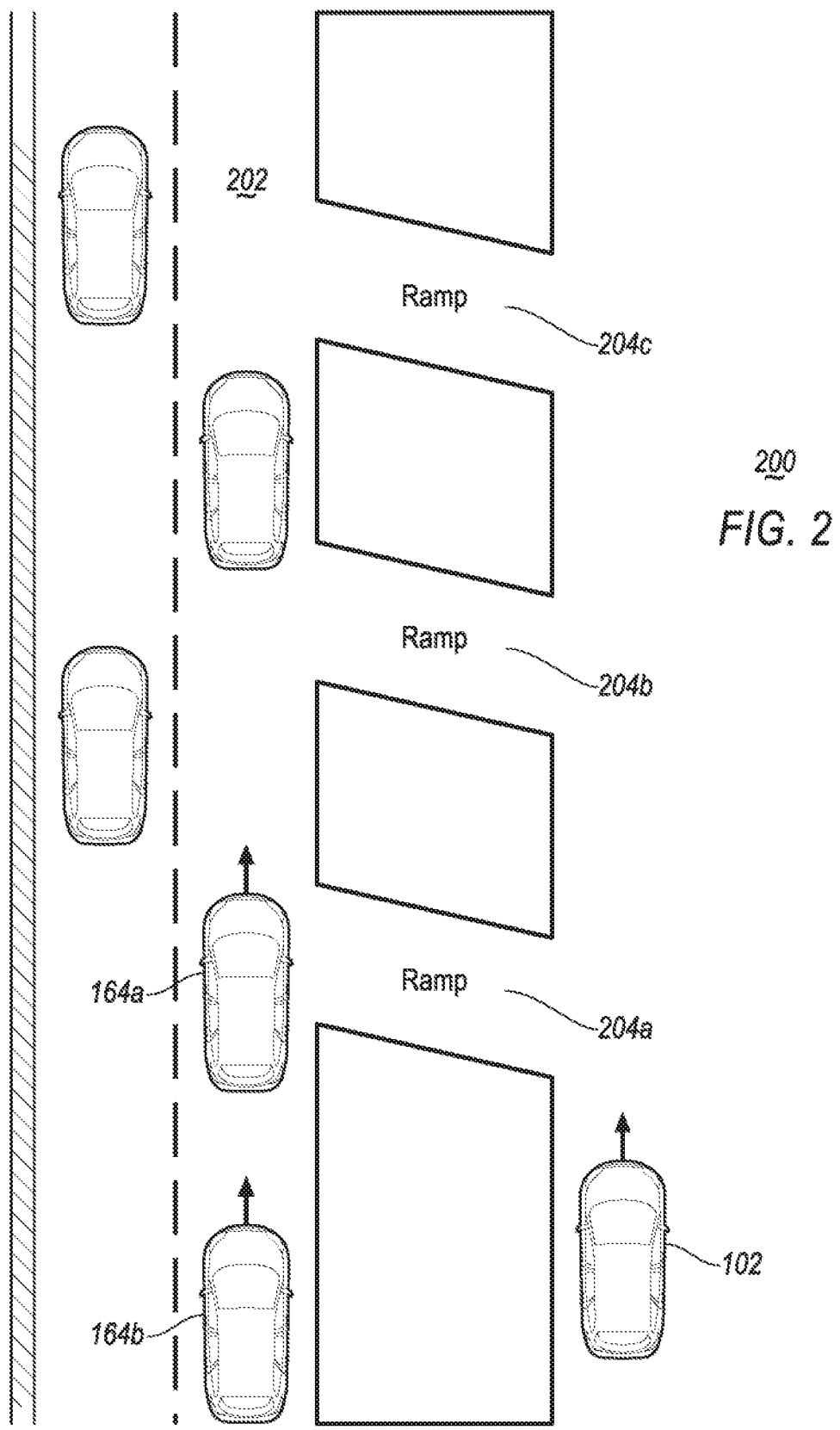
FIG. 2 illustrates an example schematic diagram of entering a highway.

Referring to FIG. 2, an example diagram of one embodiment of the present disclosure is illustrated. With continuing reference to FIG. 1, in the present example, a vehicle (hereinafter "host vehicle") 102 intends to enter a highway 202 using one of multiple ramps 204. Multiple fleet vehicles 164 may be already on the highway 202. One of the purposes of the present example may be to allow the host vehicle 102 to enter the highway 202 without impeding the traffic already on the highway 202. For instance, the host vehicle 102 and the fleet vehicles 164 may be connected via the V2V connections 166 and/or the V2I connections 158, 160 to exchanged vehicle data indicative of current status of each vehicle such as speed, route, location, distance between vehicles or the like. Using the vehicle data received from the fleet vehicles 164, the host vehicle 102 may detect a first fleet vehicle 164a followed by a second fleet vehicle 164b approaching a ramp 204a which is the close to host vehicle 102. The host vehicle 102 may be configured to evaluate if it is safe to use the ramp 204a to enter the highway 202 without interfering the traffic flow already on the highway. For instance, the host vehicle 102 may detect there is a gap between the first fleet vehicle 164a and the second fleet vehicle 164b which wide enough for the host vehicle 102 to merge in. Using the speed data from the fleet vehicles 164, the host vehicle 102 may further calculate the acceleration power needed to merge into the gap. With the required power determined, the vehicle 102 may further calculate of the current battery power is enough to perform such maneuver. If the answer is a yes, the host vehicle 102 may perform the calculated maneuver, which in the present example is to accelerate and merge onto the highway 202 via the ramp 204a. Otherwise, the host vehicle 102 may slow down and wait the traffic to pass. Alternatively, the host vehicle 102 may be configured to continue to drive on the access road and seek opportunities to enter the highway 202 later via the ramps 204b, 204c. The present example is not limited to the host vehicle 102 entering the highway 202, but also applied to operations such as lane changing, lane keeping, highway existing as well other driving situations under substantially the same principle.

Figure 3:
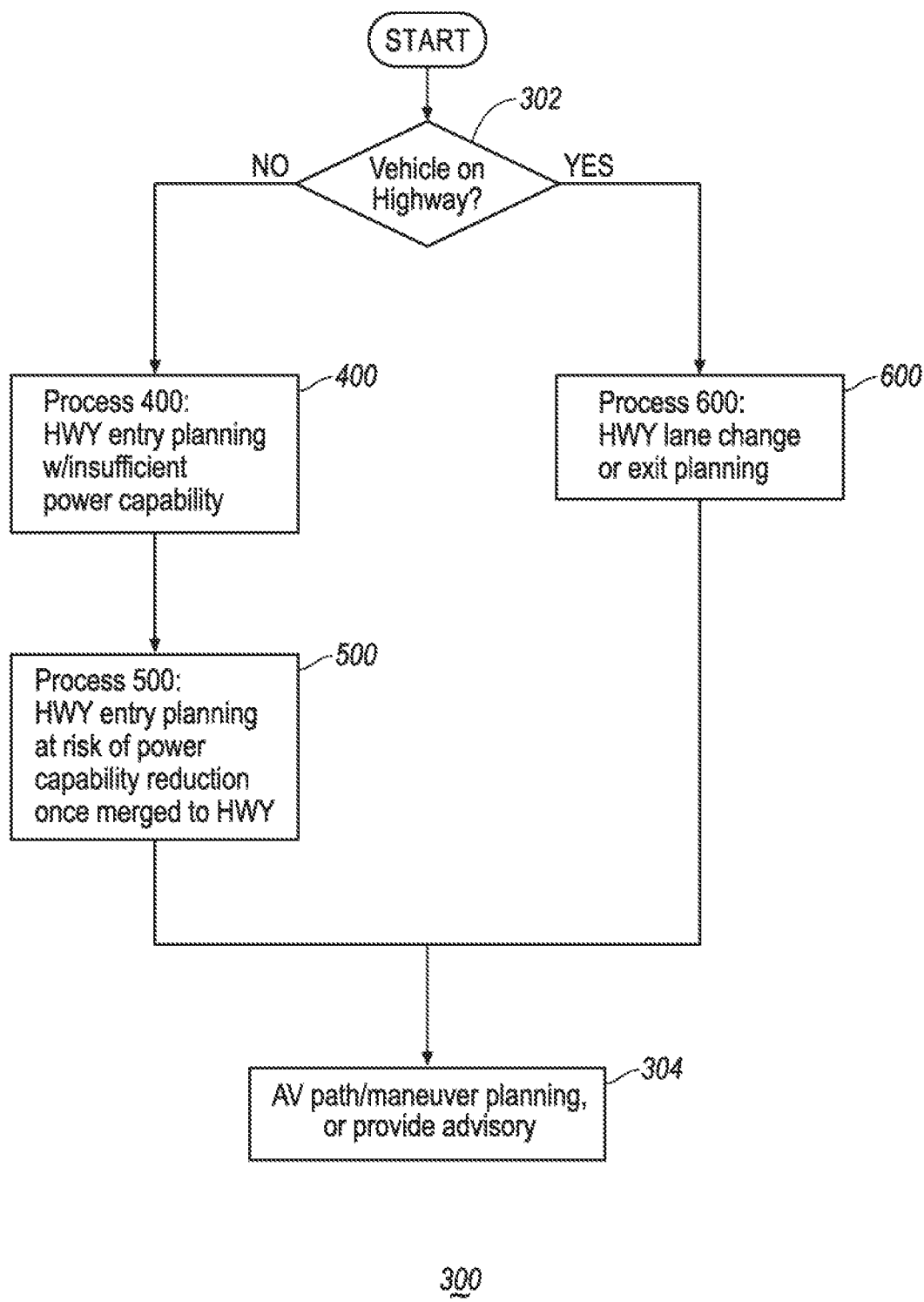
FIG. 3 illustrates an example flow diagram for a general process.

Referring to FIG. 3, an example flow diagram for a process 300 of one embodiment of the present disclosure is illustrated. With continuing reference to FIGS. 1 and 2, the process 300 (as well as all following processes) may be implemented via the ADC 152 alone or in combination with various controllers/processor in case that the host vehicle 102 is provided with autonomous driving features. Additionally or alternatively, the process 300 may be implemented via the computing platform 104 or a combination of various controllers/processors in case the host vehicle 102 is a conventional vehicle operated by a human driver. The following operations will be described with reference to ADC 152 for simplicity purposes. At operation 302, the ADC 152 verifies if the host vehicle 102 is already on the highway 202 using vehicle data such as location data and speed. If the vehicle is not on the highway yet, the process proceeds to process 400 and process 500 (to be described in detail below). Otherwise, the process proceeds to process 600 (to be described in detail below). The process 400 is directed to highway entry planning by determining if the host vehicle 102 has sufficient power to enter the highway 202. The process 500 is directed to highway entry planning by determining if the host vehicle 102 will be at risk of power capability reduction once merged to highway 202. The process 600 is directed to highway lane change and/or exit planning. All of processes 400, 500, and 600 may be based on a powertrain propulsive power capability (Pwr_Max) which is impacted by the discharge power of the traction battery 170 and electric motor torque limit (as well as gear ratio when appropriate). As mentioned above, the discharge power of the traction battery 170 may be affected by various factors including, but not limited to, battery temperature, battery size, battery age, and/or SoC. Processes 400, 500, and 600 may be further based on propulsive power request (Pwr_Req) to reach or maintain a calculated highway speed. Various factors may affect the propulsive power request including aero dynamics of the host vehicle 102, road grade, rolling resistance, and/or vehicle loads. After successfully performing the processes 400, 500 or 600, at operation 304, the ADC 152 operates the host vehicle 102 to perform the maneuver. Alternatively, the computing platform 104 outputs instructions/advisory via the HMI controls 112 to direct the driver to perform certain maneuvers.

Figure 4:
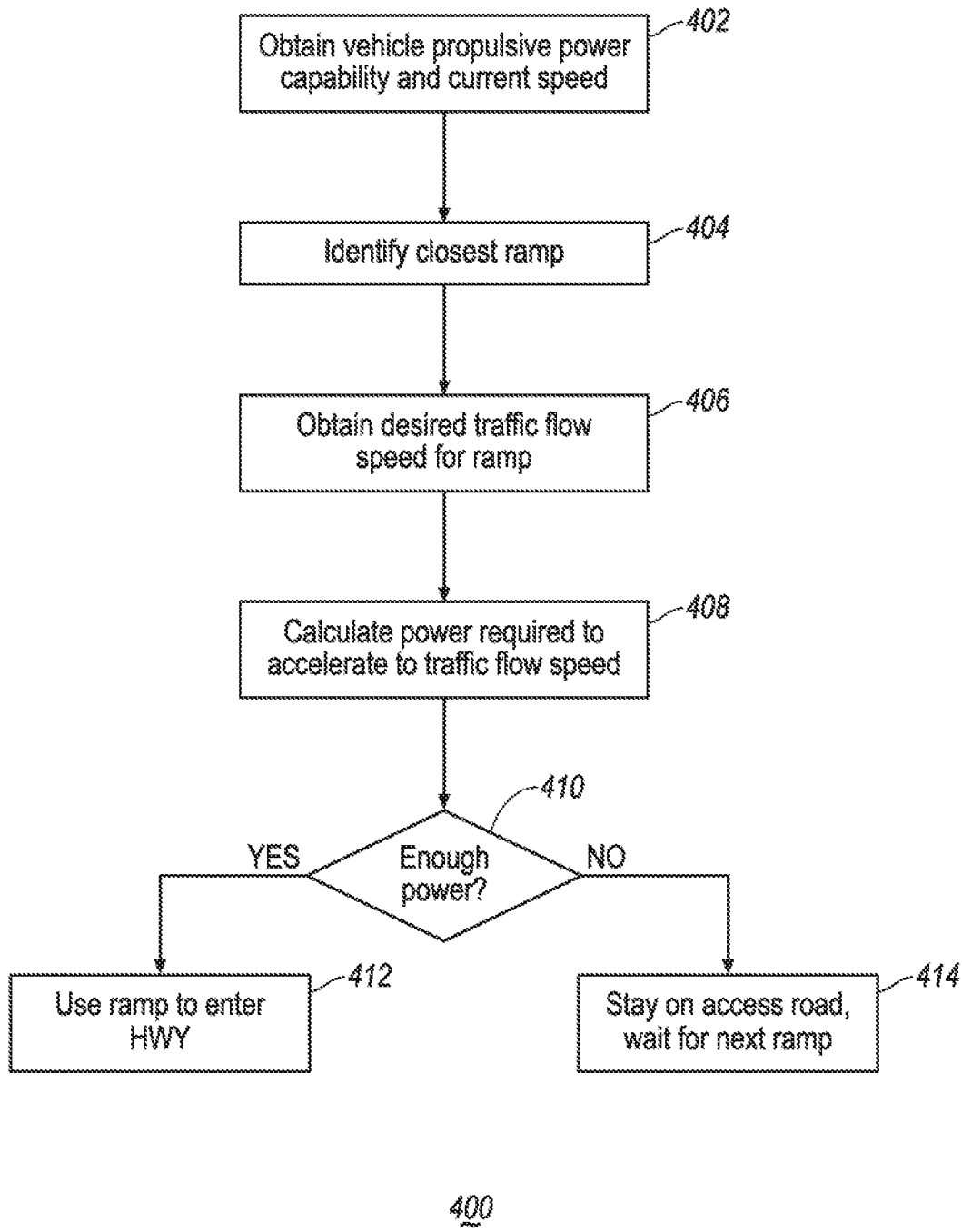
FIG. 4 illustrates an example flow diagram for a process for evaluating battery power to accelerate before entering the highway.

Referring to FIG. 4, a flow diagram for a highway entry planning process 400 of one embodiment of the present disclosure is illustrated. At operation 402, the ADC 152 obtains the propulsive power capability (Pwr_Max) and current speed (vspd_host) of the host vehicle 102. The propulsive power capability (Pwr_Max) may be calculated based on battery data from the traction battery 170 such as the battery temperature and SoC, and motor conditions from the electric motor such as motor speed and temperature. The ADC 152 may be configured to calculate the propulsive power capability (Pwr_Max) using the battery data from the traction battery 170. Alternatively, the ADC 152 may be configured to receive the propulsive power capability (Pwr_Max) calculated by other controllers of the host vehicle 102 such as by the battery controller 162. The vehicle speed (vspd_host) may be obtained from a vehicle speed sensor (not shown). At operation 404, the ADC identifies the next ramp 204 the highway 202.

At operation 406, the ADC 152 obtains a desired traffic flow speed (vspd_hwy) for the identified ramp 204 using vehicle data received from the fleet vehicles 164 via the V2V connections 166, and/or the V2I connections 158, 160. The desired traffic flow speed (vspd_hwy) may be designated as the speed for the host vehicle 102 to reach at the end of the ramp 204, so that the host vehicle 102 may join the highway traffic smoothly without causing fleet vehicles 164 to slow down. Based on the desired traffic flow speed (vspd_hwy) and the length of ramp 24, as well as various factors such as vehicle load, and/or road condition, at operation 408, the ADC calculates power required (Pwr_Req) to accelerate the host vehicle 102 from the current speed (vspd_host) to the desired traffic flow speed (vspd_hwy). At operation 410, the ADC 152 determines if the host vehicle 102 has enough power to enter the highway 202 via the ramp 204 by comparing the propulsive power capability (Pwr_Max) with the power required (Pwr_Req). If the answer is a yes, the process proceeds to operation 412 and the ADC 152 operates the host vehicle 102 to use the ramp 204 to enter the highway 202. Otherwise, the process proceeds to operation 414, and the vehicle 102 stays on the access road and waits for the next available ramp 204 to enter the highway 202.

Figure 5:
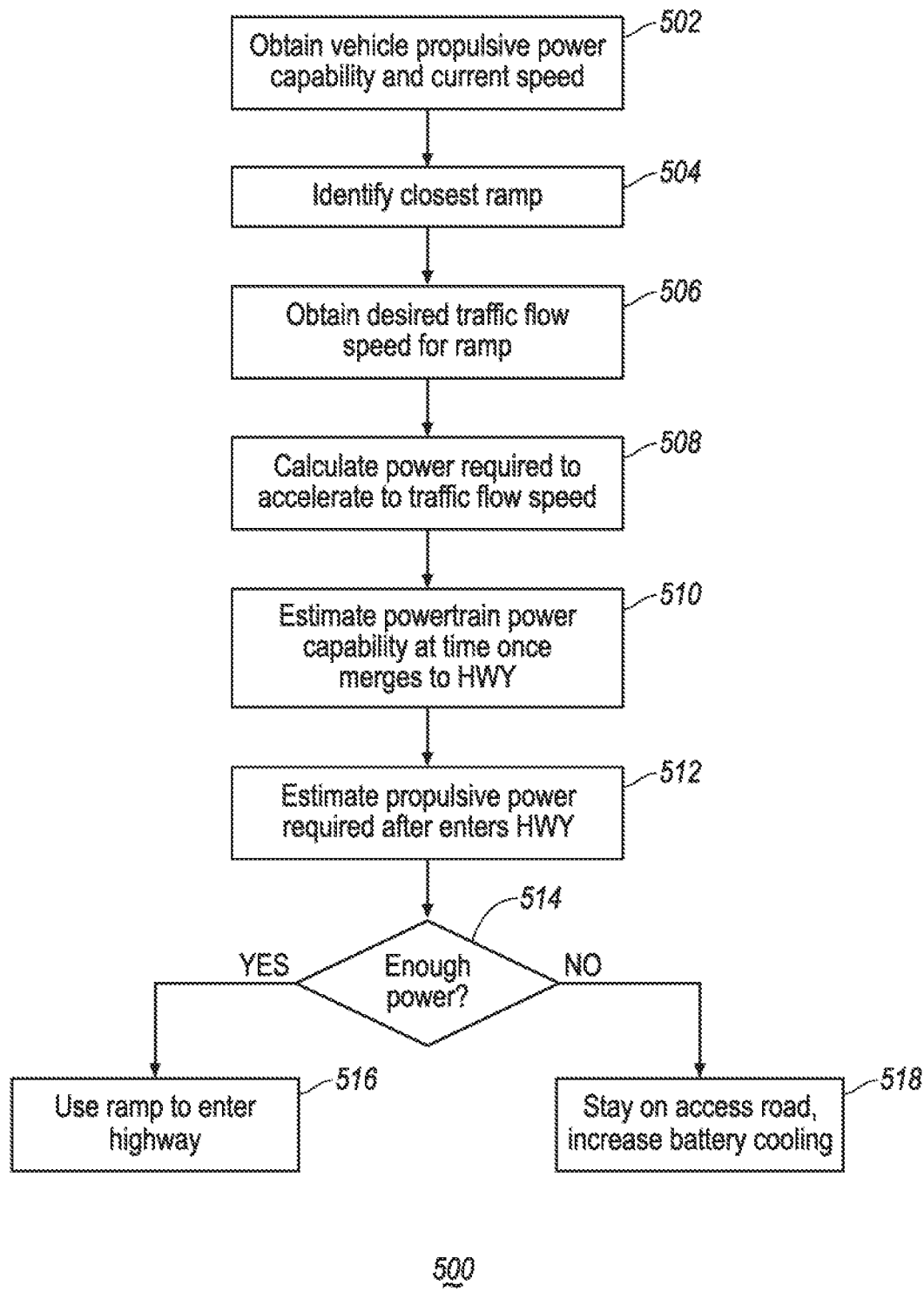
FIG. 5 illustrates an example flow diagram for a process for evaluating battery power to maintain highway speed before entering the highway.

Referring to FIG. 5, a flow diagram for a highway entry planning process 500 of one embodiment of the present disclosure is illustrated. The process 500 is directed to analyzing if the host vehicle 102 is at risk of insufficient power capability after entering the highway 202 due to battery discharge power capability reduction caused by factors such as high battery temperature or SoC drop. For instance, the host vehicle 102 has been traveled for a period of time the battery temperature is high. The host vehicle 102 may be able to accelerate and merge to the highway 202 via the ramp 204 according to the process 400. However, the traction battery 170 may be at the risk of reaching a predefined cutoff temperature threshold (Temp_pwrCutOff) above which the battery controller 162 may limit the battery output power and therefore limiting the vehicle propulsive power capability after the vehicle is on the highway 202. In other words, in this case, the host vehicle 102 may be able to enter the highway 202 according to process 400 but may not keep up with the highway speed, impeding traffic flow on the highway 202.

Operations 502 to 508 are substantially the same as operations 402 to 408 as illustrated with reference to FIG. 4 and therefore will not be repeated here. At operation 510, the ADC 152 estimates a powertrain power capability (Pwr_MaxHwyEntry) the time once the host vehicle 102 enters the highway 202 from the identified ramp 204. The powertrain power capability (Pwr_MaxHwyEntry) may be calculated based on an estimation of battery temperature (Temp_HwyMerg) assuming the host vehicle 102 enters the highway 202 from ramp 204 with the power required (Pwr_Req) calculated previously. The estimation may be presented using the following equation:

$$Pwr\_MaxHwyEntry = f(Temp\_HwyEntry \text{ if entering with } Pwr\_Req)$$

If the estimated battery temperature (Temp_HwyMerg) is higher than the cutoff temperature threshold (Temp_pwrCutOff), the powertrain power capability (Pwr_MaxHwyEntry) may be significantly restrained by the battery controller 162. At operation 512, the ADC 152 estimates the propulsive power required (Pwr_ReqHwyEntry) after entering the highway 202, as function of various factors including vehicle load, road grade, aero drag as a few non-limiting examples:

$$Pwr\_ReqHwyEntry = f(veh\ load,\ road\ grad,\ aero\ drag\ and\ etc.)$$

At operation 514, the ADC 152 determines if the host vehicle 102 has enough power to sustain the highway speed for a predefined period of time (e.g. one minute) after entering the highway 202 by comparing the powertrain power capability (Pwr_MaxHwyEntry) with the propulsive power required (Pwr_ReqHwyEntry). If the answer is a yes, the process proceeds to operation 516 and the ADC 152 operates the host vehicle 102 to enter the highway 202 via the ramp 204. Otherwise, the process proceeds to operation 518, and the vehicle 102 stays on the access road and waits for the next ramp 204 to enter the highway 202. Additionally, the battery controller 162 may increase battery cooling level to reduce battery temperature.

Figure 6:
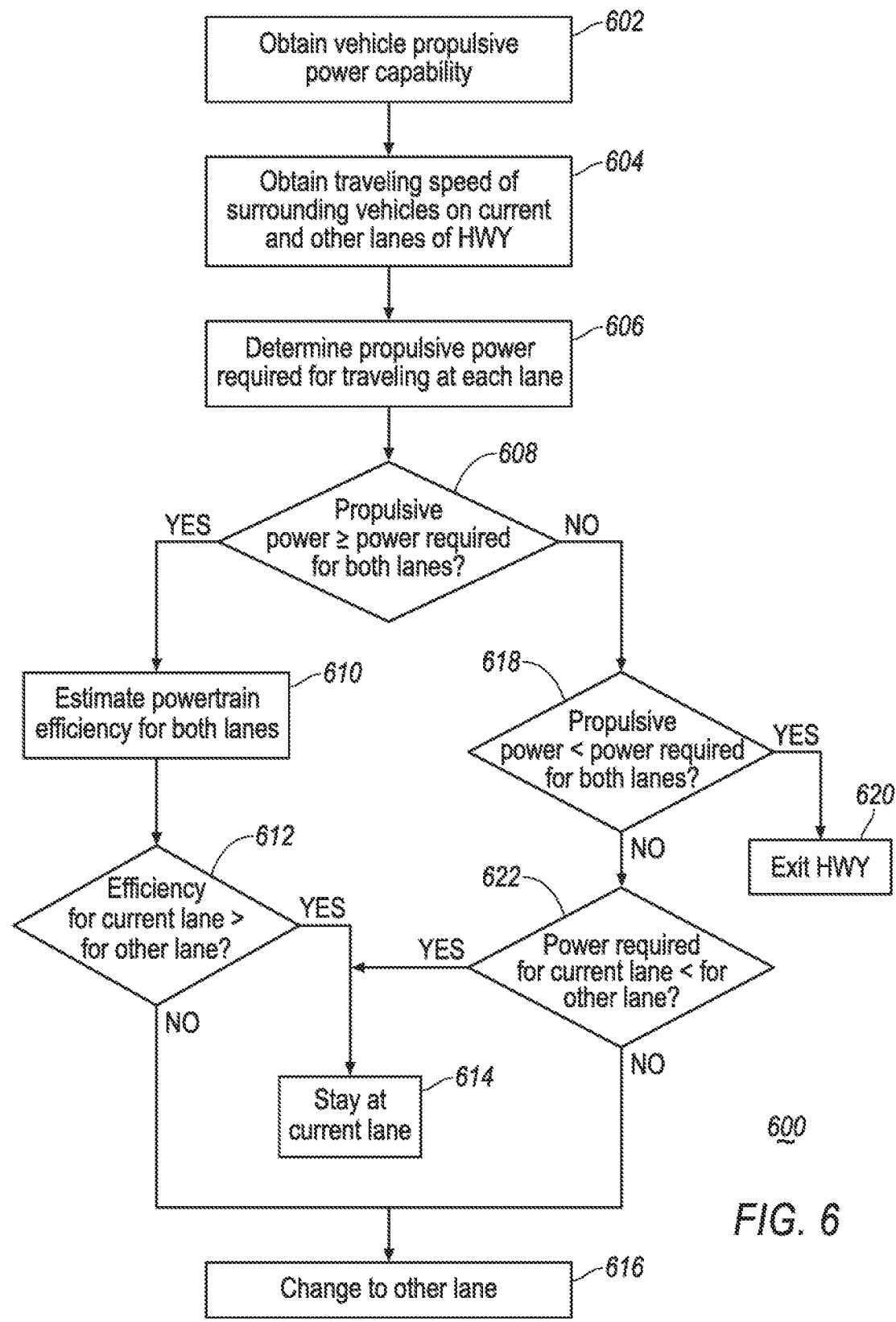
FIG. 6 illustrates an example flow diagram for a process for evaluating battery power to maintain highway speed while on the highway.

Referring to FIG. 6, a flow diagram for a highway lane change or exit planning process 600 of one embodiment of the present disclosure is illustrated. In the present example, the host vehicle 102 is traveling on a highway having only two lanes. Of course, the present disclosure may also be applied to highways having more than two lanes under substantially the same principle. At operation 602, the ADC 152 obtains the vehicle propulsive power (Pwr_Max) based on battery output power as discussed previously. At operation 604, the ADC 152 obtains traveling speed of surrounding vehicles 164 on its current lane and the other lane. Additionally or alternatively, the ADC 152 may be configured to anticipate a new travelling speed of surrounding vehicles 164 due to a speed limit change on the highway 202. For instance, the ADC 152 may predict the vehicle 102 to enter new section of the highway 202 having a different speed limit. In this case, the traveling speed of the surrounding vehicles 164 may be adjusted based on the new speed limit accordingly. Next, at operation 606, the ADC 152 determines propulsive power required to travel at the current lane (Pwr_LaneCurReq) and the other lane (Pwr_LaneOtherReq) for a calibratable driving time or distance for a smooth highway traffic flow. The calibratable driving time or distance may be predefined by the ADC 152. For instance, the calibratable driving time may be around sixty seconds and the calibratable driving distance may be around one mile. At operation 608, the ADC verifies if the vehicle propulsive power (Pwr_Max) is equal to or greater than the propulsive power required to travel at both lanes using the following formula:

$$Pwr\_Max \geq max(Pwr\_LaneCurReq,\ Pwr\_LaneOtherReq)$$

If the answer is a yes, the process proceeds to operation 610 and the ADC 152 estimates powertrain efficiency of both lanes (Eff_LaneCur, Eff_LaneOther). The powertrain efficiency may be a function of propulsive power required to travel at each lane as well as other factors such as motor and battery efficiency for BEVs.

$$Eff\_LaneCur = f(Pwr\_LaneCurReq)$$

$$Eff\_LaneOther = f(Pwr\_LaneOtherReq)$$

As a general rule, a higher propulsive power requirement results may result in a lower powertrain efficiency. At operation 612, the ADC 152 verifies if it is more efficient to continue to travel at the current lane than to travel on the other lane.

$$Eff\_LaneCur > Eff\_LaneOther$$

If the answer for the above formula is a yes, the process proceeds to operation 614 to stay at the current lane. Otherwise, if the other lane is more efficient, the process proceeds to operation 616 to change to the other lane.

At operation 608, if the ADC 152 determines the vehicle propulsive power (Pwr_Max) is not greater than the propulsive power required to travel at both lanes, which indicates the propulsive power required for at least one lane is more than the host vehicle 102 can produce, the process proceeds to operation 618 for further analysis:

$$Pwr\_Max < min(Pwr\_LaneCurReq,\ Pwr\_LaneOtherReq)$$

If the answer for the above formula is a yes, which indicates the propulsive power (Pwr_Max) is not enough for the host vehicle 102 to sustain the traffic flow speed at either lane, the process proceeds to operation 620 to plan to exit the highway 202. Otherwise, if the propulsive power (Pwr_Max) is enough for one lane of the highway 202, the process proceeds to operation 622 to verify which lane requires a lower power. If the current lane requires a lower power, the process proceeds to operation 614 to stay in the current lane. Otherwise, the process proceeds to operation 616 to change to the other lane.

In another embodiment of the present disclosure, propulsive power capability (Pwr_Max) used in above calculations may be replaced by a maximum power available at optimal or acceptable powertrain operating efficiency (Pwr_MaxEff). For BEVs, powertrain operating efficiency during vehicle propulsion may be determined by motor operating efficiency and battery discharge power efficiency. For BEVs with multi-speed gearbox, the selection of motor speed/gear for optimal motor efficiency may impact motor operation.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   a traction battery; and
   a controller programmed to, responsive to (i) a command to enter a highway, (ii) confirmation the traction battery can output power to accelerate the vehicle to enter the highway via an entrance at a same speed as traffic on the highway in a vicinity of the entrance, and (iii) an increase in temperature beyond a threshold of the traction battery predicted to occur on the highway due to expected commands to maintain the same speed on the highway with power from the traction battery, increase cooling of the traction battery prior to entering the highway.

2. The vehicle of claim 1, wherein the controller is further programmed to receive data defining the same speed via a vehicle-to-vehicle connection.

3. The vehicle of claim 1, wherein the controller is further programmed to receive data defining the same speed via a vehicle-to-infrastructure connection.

4. The vehicle of claim 1, wherein the controller is further programmed to operate the vehicle autonomously to enter the highway via the entrance.

5. The vehicle of claim 1, wherein the controller is further programmed to output an instruction via a human-machine interface to instruct a driver to use the entrance to enter the highway.

6. The vehicle of claim 1 further comprising a battery cooling system including a cooling fan, wherein increasing the cooling includes increasing a speed of the cooling fan.

7. The vehicle of claim 1 further comprising a battery cooling system, wherein increasing the cooling includes increasing liquid coolant circulation through the battery cooling system.

8. The vehicle of claim 1, wherein the controller is further programmed to establish a wireless connection between the vehicle and a fleet vehicle via a mobile device associated with a vehicle user.

9. A method for controlling a vehicle, comprising:
   responsive to (i) receiving a command to enter a highway via a first of a plurality of entrances and (ii) confirming a traction battery cannot output power to accelerate the vehicle to enter the highway via the first of the plurality of entrances at a same speed as traffic on the highway in a vicinity of the first of the plurality of entrances, operating by a controller the vehicle to bypass the first of the plurality of entrances and approach another of the plurality of entrances.

10. The method of claim 9 further comprising operating the vehicle to enter the highway via the another of the plurality of entrances regardless of whether the traction battery can output power to accelerate the vehicle to enter the highway via the another of the plurality of entrances at a same speed as traffic on the highway in a vicinity of the another of the plurality of entrances.

11. The method of claim 9 further comprising receiving data defining the same speed via a wireless connection.

12. The method of claim 11, wherein the wireless connection is a vehicle-to-vehicle connection between the vehicle and at least one vehicle operating on the highway.

13. The method of claim 12, wherein the wireless connection is a vehicle-to-infrastructure connection.

14. A vehicle comprising:
   a traction battery configured to output power for propulsion of the vehicle; and
   one or more controllers programmed to, responsive to indication that power of the traction battery output for propulsion of the vehicle will not maintain a same speed as traffic on a highway due to a predicted increase in temperature of the traction battery, operate the vehicle to exit the highway via a next available exit.

15. The vehicle of claim 14, wherein the one or more controllers are further programmed to receive data defining the same speed from a vehicle traveling on the highway via a vehicle-to-vehicle connection.

16. The vehicle of claim 14, wherein the one or more controllers are further programmed to increase cooling of the traction battery responsive to the predicted increase in temperature.

17. The vehicle of claim 14, wherein the one or more controllers are further programmed to, responsive to the indication, operate the vehicle to change lanes.

18. The vehicle of claim 14, wherein the one or more controllers are further programmed to
   calculate an efficiency for a current lane and an efficiency for a second lane based on traffic speed of each respective lane; and
   responsive to the efficiency for the second lane being greater than the efficiency for the current lane, operate the vehicle to change from the current lane to the second lane.

19. The vehicle of claim 14, wherein the operating is autonomous.

* * * * *